W. BULLOCK.
SEED PLANTER.
No. 11,464.　　　　　　　　Patented Aug. 1, 1854.
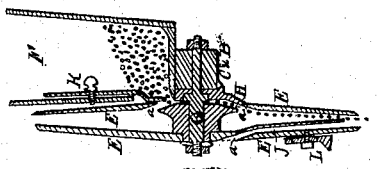
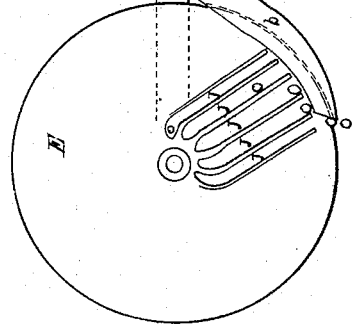
Fig. 3.
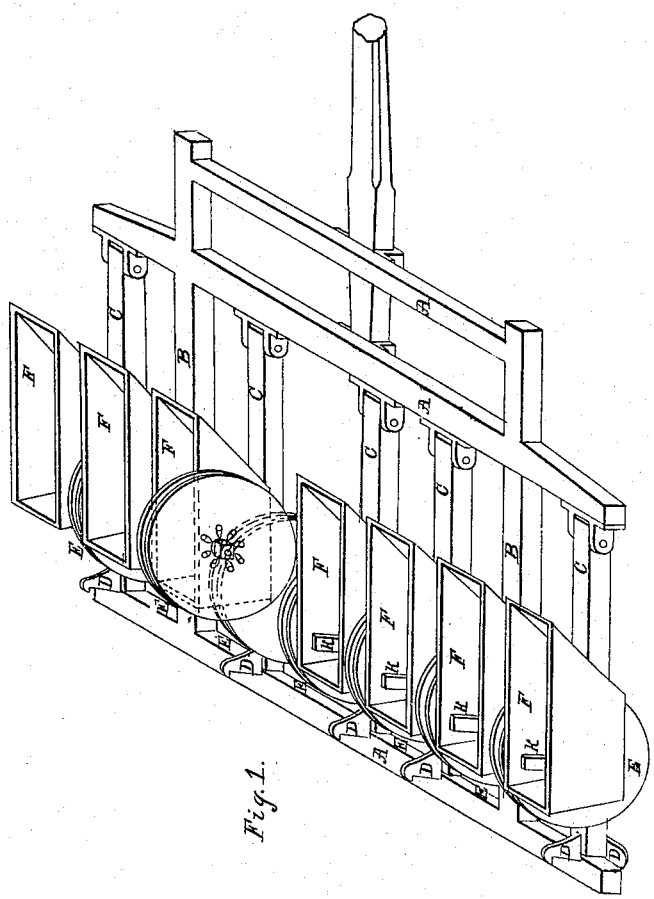
Fig. 1.
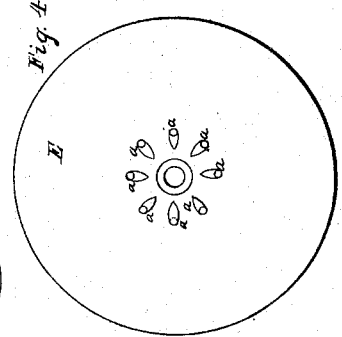
Fig. 4.

UNITED STATES PATENT OFFICE.

WILLIAM BULLOCK, OF RED FALLS, NEW YORK, ASSIGNOR TO BURTON G. MORSS.

IMPROVEMENT IN SEED-PLANTERS.

Specification forming part of Letters Patent No. 11,464, dated August 1, 1854.

*To all whom it may concern:*

Be it known that I, WM. BULLOCK, of Red Falls, in the county of Greene and State of New York, have invented certain new and useful Improvements in Grain-Drills; and I do hereby declare that the following is a full and exact description thereof.

To enable others skilled in the art to make and use my invention, I will proceed to describe the construction and operation of the same.

In the accompanying drawings, which form a part of this specification, Figure 1 is a perspective view; Fig. 2, a transverse sectional view, representing the arrangement of the hoppers in combination with the wheels, &c.; Fig. 3, an interior view of one wheel, representing the arrangement of the tubes for planting in hills; Fig. 4, an outside view of a wheel, representing the recesses for the reception and distribution of the seeds.

Like letters represent like parts in each figure.

A represents the cross-bars of frame; B, side rails, to each of which one seeding-wheel is attached; C, bars attached to the forward bar A by jaws and bolts to admit of vibration; D, guides fastened in the back end of C and fitted into slots in rear bar A. These guides are for the purpose of steadying the bars C, and have hooks at each end to prevent them from being thrown out of their places. They are of sufficient length to allow the seeding-wheels to rise and fall with the surface of the ground.

E represents the seeding-wheels, formed of conical plates. Near the center of these wheels, on one side, are cavities entirely around the center for the reception of the seeds and the distribution of the same in drills. Those wheels intended for planting in hills and drills have cavities in both their sides. In the side for drilling they pass entirely round the center, while on the opposite side of the same wheel for hilling the cavities are placed close together in one or more places, according to diameter of wheel. At the outer end of these cavities are holes passing entirely through the plates E, as represented in Figs. 2 and 4. The seeds are received in the cavities a, above the centers of the wheels, and as the wheels revolve the seeds pass in between the plates E and out at the lower edge of the wheels, back of the guards I. When planting in hills the seeds pass through the tubes J, as represented in Fig. 3. The plates forming the wheels on B are farther apart than those on C, so as to form a broader surface and prevent them from sinking deeper in the ground in consequence of sustaining the weight of the frame.

F are hoppers into which the seeds are placed. At the bottom of these hoppers, at the sides nearest to the wheels, there is a slot through which the seeds pass into the wheels. In this slot there is a slide, K, for the purpose of regulating the feed. By raising the slide the feed is increased and by lowering it is diminished, and may be entirely shut off.

G are studs, upon which the wheels revolve; H, plates serving as rests for the studs and also covering the holes through the plates E, thereby preventing the seeds from falling outside of the wheels; I, guards fastened to B and C, and fitted sufficiently close to the wheels to prevent the seeds from passing out forward and the earth from passing in between the plates E. In adhesive soils the guards I should pass in between the plates E, as represented by that part of I, Fig. 3, inside of line b, to clear them from any dirt that may get between them. The forward edge of these guards are sharp, serving as cutters, and they make furrows for the seeding-wheels.

J are tubes for conducting the seeds to be planted in hills from the centers of the wheels to the peripheries of the same, depositing the seeds in hills; L, marker opposite the tubes J on the side of the wheels, used for planting in hills. These markers leave an impression in the ground, thereby designating the position of the hills.

When it is desirable to plant in hills so as to form rows at right angles all the wheels except those to be used should be removed from the frame. For corn and beans the wheels on B only would be required. Those wheels left in the frame should be coupled together by any of the ordinary modes, and the operator should take care to have the tubes J in line, so that the seeds would drop simultaneously in both wheels. The operator should be careful and start the rows even at the commencement, having a line drawn across the edge of the field for that purpose, and start with the markers down upon the line, and, if the field be broad, should look at the position of the hills in the adjoining rows and correct any irregularity that may occur by turning the wheels forward or backward, as the case may require. When planting in hills or sowing in drills as the machine moves forward the guards I and wheels E form furrows, into which the seeds are dropped. The earth falls in behind the wheels and covers the seeds.

Having thus fully described the construction and operation of my grain-drill, what I claim therein as new and of my invention, and desire to secure by Letters Patent, is—

1. The seeding-wheels formed substantially as described, so that the seeds pass in at or near the center of the wheels and out at the periphery.

2. The arrangement of one and the same wheel for sowing in drills and planting in hills.

3. The arrangement of the tubes J, substantially as herein described and for the purpose set forth.

4. The guards I, in combination with the seeding-wheels.

5. The marker L for the purpose of indicating the position of each hill, thereby enabling the operator to plant in hills forming rows both ways across the field.

WM. BULLOCK.

Witnesses:
E. E. MILLEGAN,
J. E. BASSETT.